Sept. 13, 1966     P. L. BOURGAULT ET AL     3,273,027
THREE-TERMINAL ELECTROLYTIC DEVICE
Filed Sept. 19, 1962     2 Sheets-Sheet 1
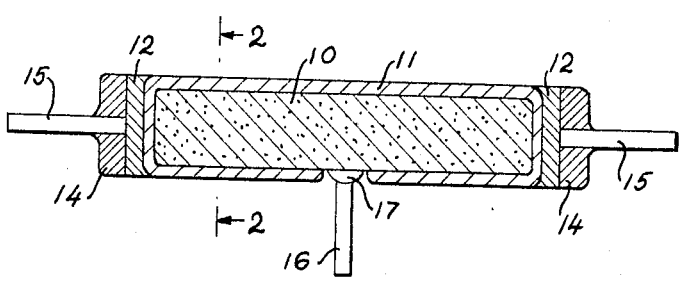
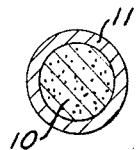
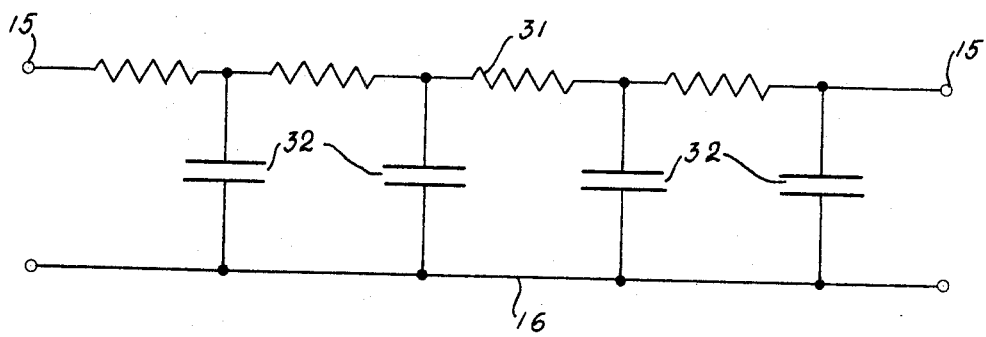
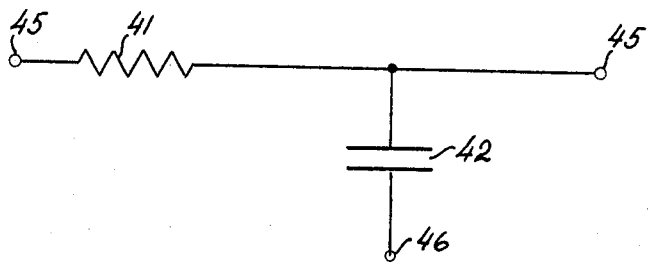
INVENTORS
PIERRE LOUIS BOURGAULT
JOOST BATELAAN
BY
ATTORNEY United States Patent Office 3,273,027
Patented Sept. 13, 1966

3,273,027
THREE-TERMINAL ELECTROLYTIC DEVICE
Pierre L. Bourgault, Etobicoke, and Joost Batelaan, Toronto, Ontario, Canada, assignors to Johnson, Matthey & Mallory Limited, Toronto, Ontario, Canada, a corporation of Canada
Filed Sept. 19, 1962, Ser. No. 224,725
12 Claims. (Cl. 317—230)

This invention relates to three terminal devices combining a resistance and a capacitance into a single unit, and, more particularly, to three terminal electrolytic devices or filters.

It is an object of the present invention to improve three terminal devices of the described general type.

It is another object of the present invention to provide a three terminal electrolytic device having a resistance between two of its terminals and a capacitance between either or both such terminals and its third terminal.

Still another object of the invention is to provide a novel and improved three terminal electrolytic device, the equivalent circuit of which may be represented by a resistor shunted along its length by a large number of small capacitors.

It is a further object of the invention to provide a three terminal electrolytic RC network characterized by distributive capacitance, which is greatly superior in performance to conventional RC networks having lumped R and C components.

It is also within the contemplation of the present invention to provide a three terminal electrolytic device which is extremely simple in structure, combines high efficiency with small dimensions and is thus readily adaptable to miniaturization and which may be readily manufactured on a quantity production scale at a competitive cost.

The invention also contemplates a novel method of manufacturing the three terminal electrolytic devices of the invention.

Other and further objects and advantages of the invention will become apparent from the following description, taken in conjunction with the accompanying drawings; in which FIG. 1 is a longitudinal sectional view of a three terminal electrolytic device embodying the invention;

FIG. 2 is a transverse section taken on line 2—2 of FIG. 1;

FIG. 3 is a schematic representation of the equivalent circuit of the three terminal device of the invention;

FIG. 4 is a view similar to FIG. 3 of a conventional RC circuit comprising lumped circuit elements;

Figure 5:
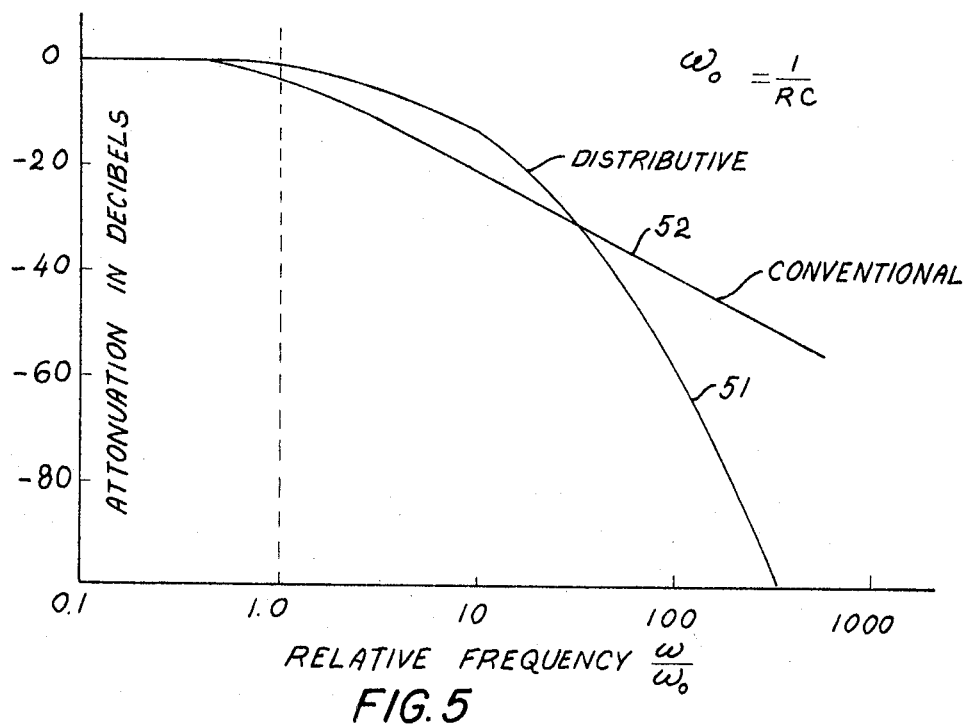
FIG. 5 is a comparative representation of the attenuation curves of the RC filters shown in FIGS. 3 and 4.

Broadly stated, in accordance with the principles of the present invention there is provided a three terminal electrolytic device incorporating a resistance and a capacitance into a single unit. In its preferred form the device of the invention comprises a sintered porous anode of tantalum, anodically formed and impregnated with a solid electrolyte, e.g. $MnO_2$. Two cathodic contacts are made to the electrolyte at different positions on the device and a third contact is provided directly to the tantalum. Between the two cathodic contacts there is a resistance and between either or both cathodic contacts and the tantalum contact there is capacitance.

The techniques used in the fabrication of this device are in some respects similar to those of conventional tantalum solid type capacitors. Briefly, the essential steps are as follows:

*Pellet preparation*

Capacitor grade tantalum powder is pressed to the desired shape and size and to a pressed density in the range of 8 to 10 gram/cc. These are then sintered in vacuum at a temperature between 1800° and 2200° C., for a period of 15 minutes to 1 hour. Pellets of tantalum powder pressed to a density of 9 gram/cc. and sintered at a temperature of 2100° C. for 45 minutes provided very satisfactory results.

*Formation*

The sintered porous pellets are anodically formed in an aqueous electrolyte so as to produce a tantalum oxide dielectric film having a thickness of 200 to 5000 A. on the tantalum surface, including the intercommunicating voids or pores throughout the pellets. The forming procedure may be varied to a considerable extent. In one practical case, a 1% phosphoric acid solution at 90° C. was used, the formation rate was about 50 milli-amperes per gram of tantalum and the final formation voltage ranged from 50 to 200 volts.

*Impregnation*

After washing and drying, the anodes are dipped in aqueous $Mn(NO_3)_2$ solution followed by pyrolytic conversion to $MnO_2$ between 180° and 400° C. This procedure is repeated from 2 to 20 times, depending upon what value of resistance is desired. Specifically, the units made to date were vacuum impregnated in $Mn(NO_3)_2$ of a specific gravity of 1.2 to 1.6. Pyrolytic conversion was at 230° C. for 20 to 30 minutes. The number of immersions varied from 2 to 16. Units having more than 4 immersion cycles were reformed at least once in dilute nitric acid.

*Contacting to $MnO_2$*

This may be achieved by coating the surface region where contact is to be made with carbon, followed by silver paint, silver epoxy resin, or a metal spray deposit. Thus, a coating of colloidal carbon sold under the name Aquadag, followed by a silver-filled epoxy resin was found very satisfactory in carrying the invention into practice. Terminal leads were imbedded in the silver epoxy resin thus avoiding the need for soldering.

Referring now more particularly to FIGS. 1 and 2 of the drawing, reference numeral 10 denotes an elongated pressed and sintered cylindrical tantalum pellet of substantially uniform cross section having intercommunicating pores or voids throughout. A polarized dielectric film is formed on the surface of said pores by any suitable procedure, said pores and said film not being shown in the drawing due to the microscopic character thereof. A solid electrolyte of manganese dioxide is pyrolytically formed in the pores of the tantalum pellet in contact with the dielectric film on the surface thereof, including the external surface of the said pellet, such manganese dioxide layer being diagrammatically indicated on such surface by numeral 11. A layer of carbon 12 is coated on the manganese dioxide layer at each end of the pellet upon which there are formed silver-filled epoxy resin layers 14 electrically and mechanically connecting the ends of cathode terminal wires 15. An anode terminal wire 16 is secured to the center region of tantalum pellet 10, as is indicated at 17. This may be achieved by embedding a tantalum wire in the tantalum powder in the pressing operation prior to sintering. It will be noted that the thicknesses of the several layers shown in these figures have been greatly exaggerated for clarity of illustration.

As it has been pointed out in the foregoing, in a three terminal device of the described type there is a resistive path or resistance between cathodic terminals 15, 15 and there is a capacitance between either or both terminals 15 and the tantalum terminal 16. As shown in FIG. 3, the equivalent circuit of this device may be represented by a resistor 31, shunted along its length by a large number of small capacitors 32. The total resistance may be varied from a few ohms to several thousand ohms and the capacitance from about one to several hundred microfarads, or more.

The electrical characteristics of this device have been calculated on the basis of the above circuit equivalent and these calculations have essentially been verified by measurements made on actual units. Although several characteristics of the novel three terminal device offer interesting possibilities, the most important practical application of the device is as an RC filter. As illustrated in FIG. 4 of the drawing, a conventional RC filter comprises a lumped resistor 41 connected between terminals 45, 45 and a lumped capacitor 42 connected across the said resistor and terminal 46. A conventional RC filter of the described character is frequently used as a low pass filter in electronic circuits.

When used for this purpose, the distributive RC device by varying the $MnO_2$ solid electrolyte within the porous sintered anode. Since the "effective conductivity" is approximately proportional to the square of the density of $MnO_2$ within the sinter, this gives quite a broad range of resistance. The density within the sinter is varied by the number of impregnation cycles and also by the concentration of the $Mn(NO_3)_2$ solution. For an even broader range of resistance, the cross section and the length of the resistance path may be varied. Units having a room temperature resistance as low as 5 ohms and as high as 8000 ohms have been made. Values from 1 ohm to higher than 10,000 ohms can also be made without undue difficulty.

When the filters of the invention are used for the purpose of smoothing rectified A.C., a considerable improvement over a conventional two component RC filter is possible. This is shown by the experimental data given in the following table in which a number of three terminal components embodying the invention are compared with conventional two component lumped RC arrangements, having equal RC products, for their effectiveness in suppressing A.C. ripple. The comparison was made using full wave rectified 60 cycle A.C. at 20 volts. The load impedance was 10 K ohms.

TABLE

| $fo$ | Distributive RC filter | | | Lumped RC filter | | |
|---|---|---|---|---|---|---|
| | R (ohms) | C ($\mu$fd) | Percent ripple | R (ohms) | C ($\mu$fd) | Percent ripple |
| .61 | 1,850 | 141 | .04 | 1,750 | 149 | .28 |
| 1.2 | 1,040 | 127 | .06 | 1,100 | 120 | .37 |
| 1.5 | 872 | 121 | .06 | 870 | 120 | .36 |
| 1.8 | 2,800 | 31.4 | .13 | 3,000 | 29.2 | 1.2 |
| 2.4 | 532 | 125 | .06 | 550 | 120 | .37 |
| 2.7 | 541 | 109 | .06 | 490 | 120 | .39 |
| 4.2 | 300 | 120 | .17 | 300 | 120 | .46 |
| 21 | 237 | 21.9 | 1.8 | 240 | 29.2 | 1.9 |
| 24 | 265 | 25.0 | 1.7 | 230 | 29.2 | 1.9 |
| 26 | 211 | 28.8 | 2.0 | 210 | 29.2 | 1.95 |
| 30 | 223 | 23.7 | 2.0 | 180 | 29.2 | 2.0 | of the present invention is greatly superior in performance to the conventional lumped RC arrangement. This may be seen from FIG. 5 which shows the attenuation in decibels as a function of frequency for the two arrangements, numeral 51 denoting the curve for the distributive RC device and numeral 52 denoting the curve for the lumped RC device. These curves represent the actual attenuation as a function of frequency for equal overall resistance and equal total capacitance in the two arrangements. Although this manner of plotting is the least favorable to the distributive arrangement, it can be seen that a much greater attenuation of high frequencies may be achieved by using the new device. A fairer comparison would be to match the two curves at e.g. 3.0 db attenuation.

Comparisons have been made between the device of the invention and conventional lumped RC arrangements for rectified A.C. filtering. It has been found that with a proper balance of resistance and capacitance in the distributive arrangement, it is possible to obtain many times the ripple suppression obtainable with a conventional RC arrangement. The ripple suppression is in fact about the same as can be achieved using two or three consecutive RC filtering stages. Thus, one single component can be made to replace 4 or 6 conventional components.

In making the three terminal electrolytic devices of the invention, the magnitude of the capacitance is controlled in the same way as in conventional solid tantalum capacitors, i.e. by controlling the amount and mean particle size of tantalum and by controlling the formation voltage. The range of capacitance values possible is the same as for tantalum capacitors of the solid type.

The magnitude of the resistance may be controlled

In addition to replacing two components by a single component, a much better ripple suppression can be achieved with the distributive units. As can be expected from the attenuation curves for conventional and distributive RC filters (FIG. 5), the distributive system is most advantageous for large RC products, i.e. when $fo$ is small compared to the frequency of the signal that is filtered. In the present case the two component lumped system gives the same amount of ripple (2%) as the distributive units for $fo$ values of 25. For low values of $fo$, (e.g. 0.6), the ripple suppression is seven times greater for the distributive RC arrangement of the invention.

Although the present invention has been described in connection with a preferred embodiment thereof, as applied to the $Ta$-$Ta_2O_5$-$MnO_2$ system, variations and modifications may be resorted to by those skilled in the art without departing from the principles of the invention. Thus, substrate metals other than tantalum may be used, the only basic requirement being that they be so-called film-forming or valve metals, capable of forming a non-conducting oxide film, such as niobium, aluminum, or zirconium.

As to the electrolyte, for smoothing or any other applications involving D.C. current, only an electronically conducting electrolyte can be used. In principle, this could be a metal or any of a large number of metal oxides or sulphides including the oxides of manganese, nickel, lead, tin, iron, cadmium, or any variations of these through "doping" or otherwise adding impurities. Generally, semiconducting materials are preferred to metals because of the lesser tendency of the former to cause short circuiting through imperfections in the oxide film.

For applications in which only A.C. current is involved, as for example in simple filtering applications, an ionic as well as an electronic conductor may be used as the electrolyte. In this case any of the many aqueous or non-aqueous electrolytes compatible with the valve metal may be employed. Sulphuric acid is an example of an electrolyte suitable for use with tantalum. A practical construction for a three terminal device utilizing a "wet" ionically conducting electrolyte is shown in FIG. 6.

Reference numeral 61 denotes a cylindrical tube of tantalum in the center portion of which there is secured a pressed and sintered tantalum anode 62 having intercommunicating pores with a dielectric film thereon. The open ends of tube 61 are sealed by insulative closure members 63 through which extend cathode terminal wires 64, to the end of each of which is welded or otherwise secured a contact plate 65. The terminal wires 64 and contact plates 65 may be formed of any suitable metal, such as of silver, or copper. An electrolyte 66, such as sulphuric acid, impregnates the porous tantalum anode 62 and also fills out the free spaces between the said anode and the closure members 63, submerging contact plates 65. An anode terminal wire 67 is welded to the outer surface of tantalum tube 61.

Figure 6:
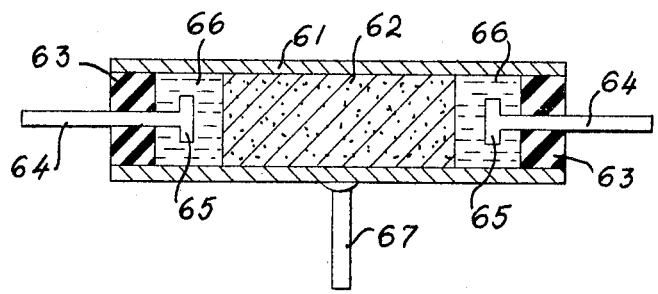
FIG. 6 is a longitudinal sectional view of a modified three terminal device embodying the invention and comprising a liquid ionic electrolyte.

It will be noted that in the three terminal device of FIG. 6, a resistance is interposed between the two cathodic terminals 64 and a distributive capacitance is provided between either, or both, terminals 64 and tantalum terminal 67.

In the preferred embodiments of the invention, the porous anode is of uniform cross section throughout the length thereof. It is entirely possible, however, to employ anodes of non-uniform cross section, for example, tapered units, such as units in the shape of truncated pyramids and hemispheres. It has been found that, in the case of tapered units, the cut-off frequency and the shape of the attenuation curve are different for the two different directions of current flow.

One of the practical limitations of the $Ta-Ta_2O_5-MnO_2$ system is that conduction in the device is through the solid $MnO_2$, which material has a relatively high temperature coefficient of resistivity. The resistivity of $MnO_2$ changes by a factor of about 2.5 in going from 25° C. to −55° C. In view of this, means of impregnating with other electrolytes having lower temperature coefficients of resistivity are of considerable practical interest.

The term "electrolyte" is used herein only in keeping with the accepted practice in the electrolytic capacitor field. What is in fact meant is the conductor, (ionic or electronic), which is in contact with the dielectric on the side opposite to the substrate metal itself. As in the case of tantalum solid capacitors, this may be an electronically conducting solid material in which case it is not an electrolyte in the conventional sense of the word.

What is claimed is:

1. In a device of the character described, the combination comprising an anode of film-forming metal having inter-communicating pores, a continuous dielectric film on the surface of said anode and said pores, a resistive electrolyte covering said film throughout said anode, an anode terminal electrically connected to said anode and insulated from said electrolyte, and a pair of cathode terminals electrically connected to spaced regions of said electrolyte.

2. A three terminal device comprising a porous anode of film-forming metal having a dielectric film covering the surface of the anode and pores, a resistive electrolyte covering said film throughout said anode including the exterior surface thereof, an anode terminal projecting from the anode and insulated from said electrolyte, and a pair of cathode terminals respectively connected to spaced regions of said electrolyte.

3. A three terminal device comprising a porous tantalum anode pellet characterized by intercommunicating voids and having a continuous dielectric film formed on its exterior surface and the surface of its voids, a resistive solid electrolyte in contact with said film throughout said voids and including the exterior surface of said pellet, an anode terminal connected to said tantalum pellet and insulated from said electrolyte, and two cathode terminals respectively connected to two different and spaced surface portions of said electrolyte.

4. A three terminal device comprising a porous tantalum anode pellet having a multiplicity of intercommunicating voids with a dielectric film formed on the entire exterior surface and surface of the voids thereof, a solid electrolyte of manganese dioxide in contact with said film throughout said voids and forming a continuous layer on the exterior surface of said pellet, a pair of contact layer regions spaced from each other and in contact with corresponding regions of said exterior surface, a cathode terminal electrically connected to each of said contact regions, and an anode terminal electrically connected to said tantalum pellet and insulated from said electrolyte, the portions of the electrolyte electrically interposed between said cathode terminals constituting a resistive path having high distributed capacitance with respect to said anode pellet.

5. A three terminal device comprising an elongated porous tantalum anode pellet having a multiplicity of inter-communicating voids with a polarized dielectric film formed on the entire surface including the pores thereof, a solid electrolyte of manganese dioxide in contact with said film on said surface and throughout said voids and exposed at each end region of said elongated pellet, a contact layer on each of said regions, a cathode terminal connected to each of said contact layers, and an anode terminal connected to said tantalum pellet and insulated from said electrolyte, said three terminal device constituting an RC network comprising a resistive path interposed between said cathode terminals and high distributed capacitance defined between said path and said anode terminal.

6. The three terminal device claimed in claim 5, in which the porous tantalum anode pellet is of uniform cross section throughout its length.

7. The three terminal device claimed in claim 5, in which the porous tantalum anode pellet is of tapered cross section.

8. A three terminal device comprising an elongated casing, a closure member for each end of said casing and defining therewith a sealed enclosure, a porous anode of valve metal having a dielectric film thereon in said casing and spaced from said closure members, a liquid ionic electrolyte filling out said casing and impregnating said porous anode, a terminal connected to said anode and insulated from said electrolyte, and a cathode terminal at each end region of said casing in electrical connection with said electrolyte in such region.

9. A three terminal device comprising a tube of valve metal, a closure member of insulating material for each end of said tube and defining therewith a sealed enclosure, a sintered porous anode of valve metal in and electrically connected with the center region of said tube and spaced from said closure members, said tube and porous anode having a continuous dielectric film on the surface thereof, a body of liquid ionic electrolyte filling said tube and impregnating said porous anode, an anode terminal connected to said tube, and a cathode terminal extending through each of said closure members into contacting relation with the corresponding end of said electrolyte body.

10. A three terminal device comprising a tube of tantalum, an insulative closure member for each end of said tube and defining therewith a sealed enclosure, a sintered porous tantalum anode in and electrically connected with the center region of said tube and spaced from said closure members, said tube and porous anode having a continuous dielectric film on the surface thereof, a body of compatible aqueous electrolyte filling said tube and impregnating said porous anode, an anode terminal connected to said tube, a cathode contact plate in each of the ends of said electrolyte body, and a cathode terminal for each of said contact plates extending in fluid-tight relation through the respective closure member thereby defining a resistive path between said cathode terminals and a high distributive capacitance between said path and said anode terminal.

11. The method of making a three terminal device which comprises providing a porous anode of film-forming metal having a terminal projecting therefrom and a dielectric film covering the exterior and porous surfaces thereof, forming an electrically resistive solid electrolyte in the pores and on the surface of said anode and in contact with said film, depositing a contact layer on each of a pair of spaced externally exposed surface regions of said electrolyte, and connecting a cathode terminal to each of said contact layer regions.

12. The method of making a three terminal device which comprises providing an elongated anode of tantalum including a terminal extending therefrom and characterized by intercommunicating pores and having a continuous dielectric film on its exterior surface and the surface of said pores, pyrolytically forming a solid electrolyte of manganese dioxide contacting said film on the exterior surface and in said pores and exposed at each end of said anode, depositing a contact layer on each end of said anode, and electrically and mechanically securing a terminal to each of said contact layers.

References Cited by the Examiner
UNITED STATES PATENTS

| | | | |
|---|---|---|---|
| 1,770,465 | 7/1930 | Edelman | 317—230 |
| 2,504,178 | 4/1950 | Burnham | 317—230 |
| 2,611,040 | 9/1952 | Brunetti | 317—101 |
| 2,936,514 | 5/1960 | Millard | 317—230 |
| 3,036,249 | 5/1962 | Hall | 317—230 |
| 3,054,029 | 9/1962 | Wagner | 317—230 |
| 3,115,596 | 12/1963 | Fritsch | 317—230 |

JOHN W. HUCKERT, *Primary Examiner.*

JAMES D. KALLAM, *Examiner.*